James V. Johnston
INVENTOR.

James V. Johnston
INVENTOR.

United States Patent Office 2,966,803
Patented Jan. 3, 1961

2,966,803
TOROIDAL GYROSCOPE
James V. Johnston, 821 Giles Drive, Huntsville, Ala.
Filed Apr. 1, 1960, Ser. No. 19,428
8 Claims. (Cl. 74—5)
(Granted under Title 35, U.S. Code (1952), sec. 266)

The invention described herein may be manufactured and used by or for the Government for governmental purposes without the payment of any royalty thereon.

This invention relates to a toroidal gyroscope. Such a device can be used to replace any standard gyroscope, such as one, for example that is used on a stabilized platform in missile guidance systems.

The conventional gyroscope has a rotor shaft in a housing that is supported by a pair of gimbal rings. The bearings of these gimbals and the rotor shaft cause precessional errors which constrain the gyroscope to drift.

In view of these facts, an object of this invention is to provide a gyroscope whose rotating mass is suspended without the use of a center support, such as a shaft.

Another object is to provide a gyroscope with the mass of its rotor shifted from the center of its rotational path.

Another object is to provide a gyroscope having a rotor of toroidal or doughnut shape, without any weight, at the axis of rotation.

A further object is to provide a gyroscope without solid bearings, which create undesired frictional torques.

The foregoing and other objects of this invention will become more fully apparent from the following detailed description and from the accompanying drawings, in which.

Figure 1:
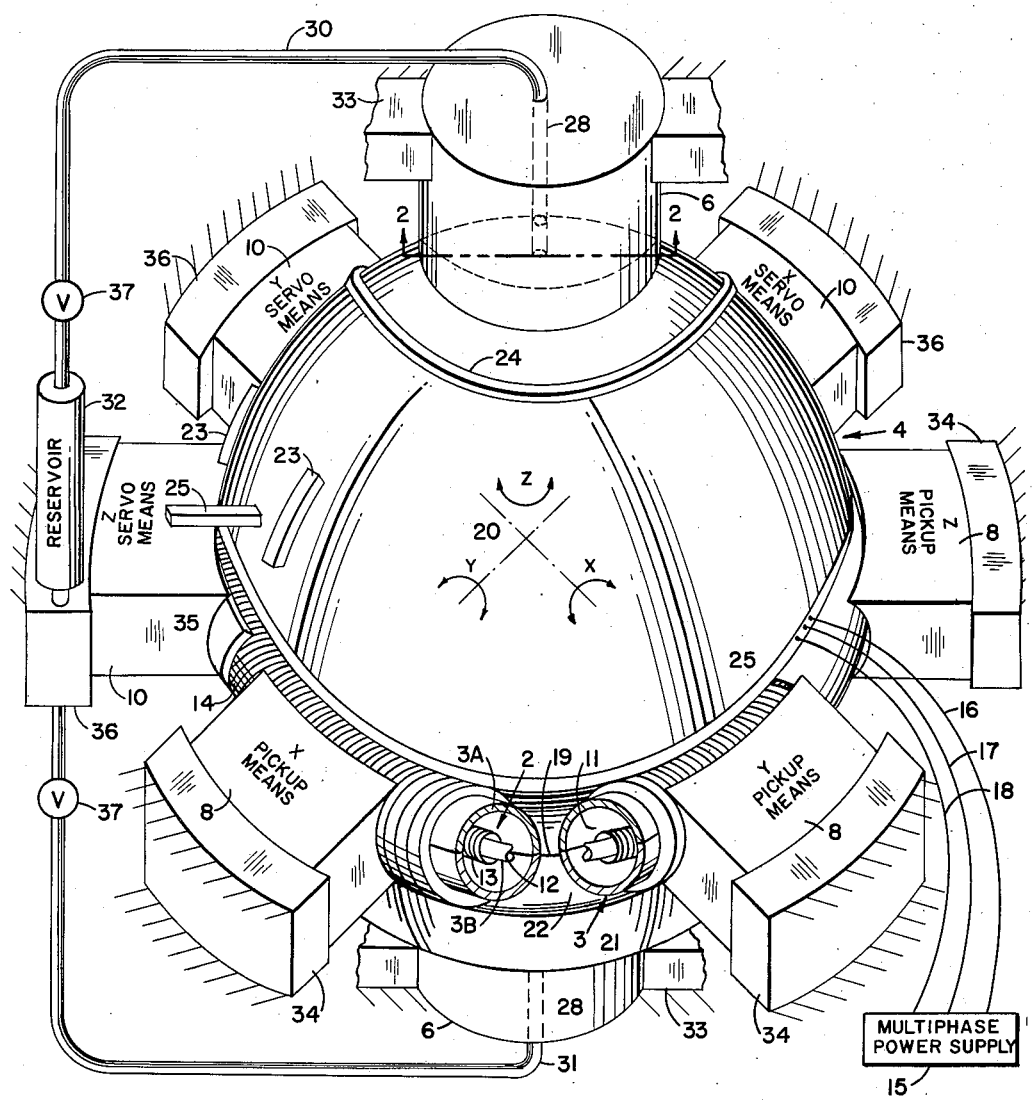
Figure 1 is a perspective view, partly broken away, of one embodiment of the gyroscope.
Figure 3:
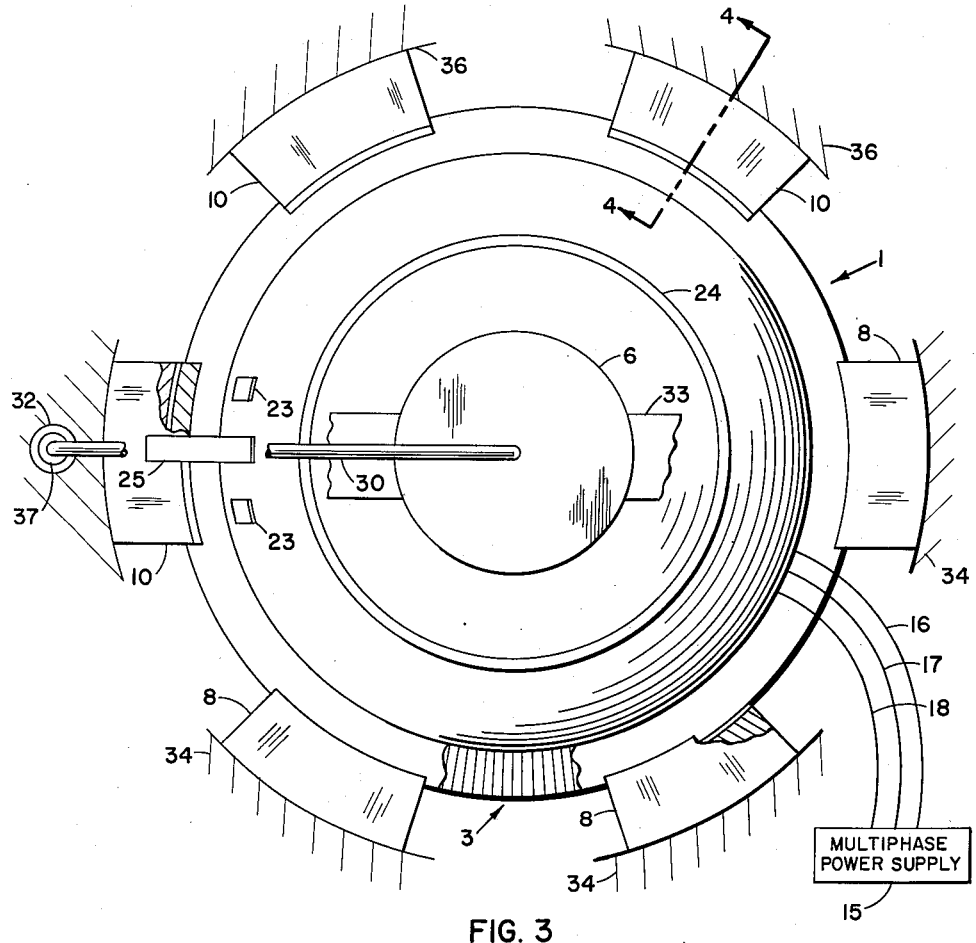
Figure 3 is a plan view, partly broken away, of the gyroscope.
Figure 4:
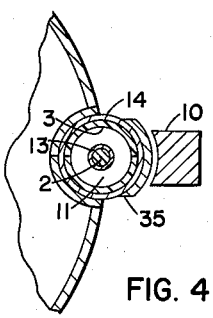
Figure 4 is a sectional view showing how the gyroscope's magnets are positioned in relation to the stator.

In the drawings, wherein for the purpose of illustration there is shown a preferred embodiment of the invention, the numeral 1 designates a gyroscope having a rotor 2, a stator 3, a spherical body 4, a pair of air bearing supports 6 for said body, electrical pickup means 8, magnetic servo means 10 and reservoir means 32.

The rotor is made in the shape of a ring 12 from a type of metal, such as Swedish iron, that has a high permeability and lower resistivity. This ring is covered by closely spaced windings 13, which are formed preferably from heavy-gauge wire. The two ends of these windings are shorted together, thereby forming a continuous winding.

Toric stator 3 is of non ferrous material, such as plastic, and is formed in two parts 3A and 3B, which form an annular bore 11. The stator may be perforated to conduct heat away from the rotor, which is loosely fitted inside the bore; or the junction of its two parts may be sealed and the air inside evacuated to reduce air friction. The external portion of the stator comprises a lacquer coated field winding 14. This field winding is wound in three sections, having external power supply terminals 16, 17 and 18, so as to form a three-phase, rotating-flux field. This field winding, however, is not limited to three sections, but may comprise four or more. Terminals 16, 17 and 18 are connected to a multiphase power supply 15.

Stator 3 is rigidly supported in spherical body 4. This body is made in two sections 20 and 21, that are joined along line 19, to form a recess 22 that is semi-circular in cross section, in which the stator is fixed.

Section 20 of body 4 has a ring-shaped stop 24 and a pair of stops 23 that are positioned adjacent the upper half of recess 22. Stops 23 limit movement of body 4 about the Z axis by abutting stop arm 25. Ring-shaped stop 24 limits movement of the body about the X and Y axes by abutting the base of the upper air bearing support 6.

Figure 2:
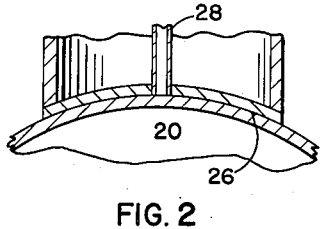
Figure 2 is a sectional view along the line 2—2 of Figure 1.

The air bearing supports 6, which provide frictionless mounts for body 4, have concave surfaces 26 which have the same radius as the portion of the sphere that is contacted by these concave surfaces as shown in Figure 2, each support has a central inlet pipe or aperture 28 extending throughout the longitudinal length of each support. One end of each pipe 28 terminates adjacent the sphere and the other end is connected via one of a pair of conduits 30 and 31 to a reservoir 32, containing air or other gas under pressure. The end of each support that is opposite from sphere 20—21 is secured in a mount 33, which may be, for instance, part of a movable vehicle, such as a missile or aircraft. In Figure 1, the gyroscope is shown with three conventional pickup means 8, one for each axis, positioned to send electrical signals of movement of the stator relative to the three axes. These pickup means are secured to other mounts 34, which are rigid with mounts 33. The pickups may be of either an electrical or optical type.

Three magnetic servo means 10, one for each axis, preferably comprising electromagnets (Figure 1), are fixed to supports 36 that are fixed relative to said mounts and are positioned around the stator. In the beginning of its operation body 20—21 will be centered relative to the X, Y and Z axes by magnetic forces from the servo means, attracting magnets 35 of a polarity opposite from said electromagnetic means.

It is to be understood that more than one rotor and stator could be used with the same body. The rotors could be counter-rotating for better stability.

The operation of this embodiment is as follows:

Valves 37 for controlling air to the bearing supports are turned on and the magnetic servo means are actuated, thereby initiating the centering of the gyroscope.

As the gyroscope is being centered, the pickup means are continually changing their output until there is no signal and no displacement of the gyroscope. (The gyroscope is then centered.)

If power to the toric stator has not already been switched on, with the servos, this power is now supplied from the power supply. This power produces a large flux field inside the stator, which is strongest near the stator windings and weakest in the center of the stator. Since three-phase power is used the flux will rotate inside the toric stator, and large amounts of the field will pass thru low-resistance rotor 12. This part of the field passing thru the rotor induces a voltage in the shorted winding of the rotor, causing a substantial current to pass thru the rotor winding.

This current produces a flux field which is in opposition to the original flux field. These opposing flux fields will repel each other and, in so doing, will push the rotor toward the center of the stator.

As the rotor is positioned in the center of the stator, it is freed from the resistance of metallic friction and begins rotating concentrically to the toric stator, due to the opposing flux fields. After the rotor reaches high speed the servo means is turned off. Thereafter, while the stator continues to receive current from source 15, the rotor 12 and body 20—21 (which is centered relative to the rotor) continue to hold their position in space. Any movement relative to this position of the platform or other support for mounts 33, 34 and 36 causes a signal to be supplied from the pickups.

It is to be understood that the form of the invention that is herein shown and described is the preferred embodiment, and that various changes in the shape, size and arrangement of parts may be resorted to without departing from the spirit of the invention, or the scope of the subjoined claims.

The following invention is claimed:

1. A gyroscope comprising: a doughnut-shaped rotor of ferrous material; an electrically shorted element enclosing and attached to said rotor; a stator, comprising electrical windings, loosely enclosing said rotor; a source of power connected to said electrical windings; a body having upper and lower spherical surfaces, said stator being fixed at substantially the center of said body; a pair of spaced stops secured to said body adjacent said stator; a ring-shaped stop secured to said body adjacent said first-named stops; upper and lower air bearing means, comprising a bearing support for universally mounting said body, each of said means supporting one of said spherical surfaces on a gaseous film; a pressurized reservoir flow-connected to said air bearing means; servo means rigid with said bearing support for placing said body in a position of zero displacement; a stop arm secured to one of said servo means and extending to a point between said spaced stops; and pickup means rigid with said bearing support for indicating when said bearing support deviates, in any direction.

2. A gyroscope comprising: a ring-shaped rotor of ferrous material; an endless member enclosing and fixed to said rotor; a ring-shaped stator comprising electrical windings, said stator being hollow in cross section and enclosing said rotor within its hollow space; a source of power connected to said windings; a body having upper and lower spherical surfaces, said stator being fixed at substantially the center of said body; air bearing means, comprising a bearing support for universally mounting said body, each of said bearing means supporting one of said spherical surfaces on a gaseous film; means for supplying a source of pressure to said air bearing means; servo means rigid with said bearing support for placing said body in a position of zero displacement; and pickup means rigid with said bearing support for indicating when said bearing support deviates, in any direction.

3. A device as set forth in claim 2 in which said stator comprises two equal parts adapted to enclose said rotor when said parts are joined together, said windings being multiphase and of wire.

4. A device as set forth in claim 2, in which the middle portion of said body is provided with an inwardly concave recess and said stator is retained in and is partially enclosed by said concave recess.

5. A device as set forth in claim 1, in which said ring-shaped stop abuts said upper one of air bearing means.

6. A device as set forth in claim 2, in which each of said air bearing means comprises a concave surface adapted to receive a portion of said body, and a longitudinal aperture having one end flow-connected to said means for supplying a source of pressure and the other end opening into said concave surfaces.

7. A gyroscope comprising: a toroidal rotor; a shorted member enclosing said rotor; a hollow toroidal stator formed in two parts and loosely enclosing said rotor; a multisection member enclosing said stator; a multiphase source of power connected to said last-named member; a spherical body having an upper and lower part, said parts of said body providing a recess around the circumference of said body when said parts are joined, said recess being adapted to secure said stator between said body parts; a pair of spaced stops secured to the upper part of said body, adjacent said recess; a ring-shaped stop secured to said upper part of said body, above said first-named stops; an upper and a lower, air bearing, comprising a bearing support, said bearings being provided with a concave surface and a longitudinal aperture, said bearings being positioned so that each of said concave surfaces universally mounts said spherical body, said upper bearing adapted to serve as an abutment for said ring-shaped stop; a pressurized reservoir flow-connected to each of said apertures in said air bearings; a plurality of servo means rigid with said bearing support and spaced around said stator for centering said body in a position of zero displacement; a stop arm secured to one of said servo means and extending to a point between said spaced stops; a plurality of pickup means rigid with said bearing support; for producing a signal when said bearing supports deviates in any direction.

8. A device as set forth in claim 2, in which said endless member comprises wire windings.

References Cited in the file of this patent
UNITED STATES PATENTS

| | | |
|---|---|---|
| 1,802,108 | Chessin | Apr. 21, 1931 |
| 2,691,306 | Beams et al. | Oct. 12, 1954 |
| 2,871,703 | Walker | Feb. 3, 1959 |
| 2,894,396 | Jofeh | July 14, 1959 |
| 2,915,902 | Brugger | Dec. 8, 1959 |